No. 5,261.  PATENTED AUG. 28, 1847.
A. TURNBULL.
TANNING.
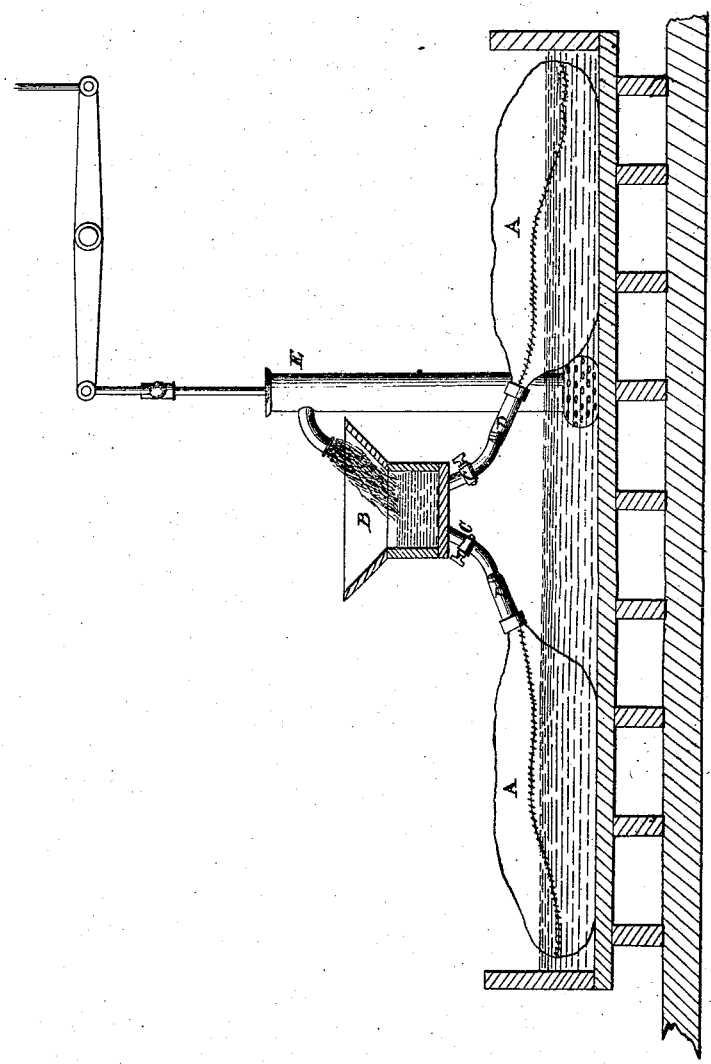
Witnesses
Paul R. Hodge
John R. Rigley
Inventor
A. Turnbull

UNITED STATES PATENT OFFICE.

ALEXANDER TURNBULL, OF LONDON, ENGLAND.

TANNING.

Specification of Letters Patent No. 5,261, dated August 28, 1847.

*To all whom it may concern:*

Be it known that I, ALEXANDER TURNBULL, Doctor of Medicine, of Rouel House, Tannery Blue, Anchor Road, Bermondsy, London, in the county of Surrey and Kingdom of Great Britain, have invented a new and Improved Mode or Method of More Speedily and Effectually Tanning Hides and Skins, and Extracting the Lime from Hides or Skins Before Being Tanned; and I do hereby declare that the following is a full and exact description, a reference being had to the annexed drawing, making part of this specification.

The nature of my invention consists of the adaptation of a newly discovered law called endosmosis and exosmosis to the tanning of hides and skins and also in the use of sugar or saccharine matter of any description for the purpose of extracting the lime from hides and skins before being tanned.

To enable others skilled in the art to make and use my invention I will proceed to describe the adaptation and action of the before mentioned laws of endosmosis and exosmosis to the purpose of tanning. Also the operation and use of sugar or any other saccharine matter whether obtained from the sugar cane, honey beet root, turnips, potatoes, the maple tree, or other vegetable substance for the purpose of extracting lime from hides or skins.

The present known method of removing lime from hides or skins after the hair is taken off is by a preparation called "grainer" which is mainly composed of the excrement of animals, this being of a strong alkaline nature necessarily destroys a considerable portion of the gelatinous matter in the operation of extracting the lime at the same time much injury is done to the texture of the skin by its rapid action in causing decomposition and destroying the grain side of the skin especially in summer. It must be obvious, however, that the moment the skin imbibes lime in any quantity its effects and influence on the hide or skin is to a considerable extent permanent and destructive. I therefore have directed my attention to the best method of extracting the lime from hides or skins.

The best and cheapest chemical solvent for lime is by taking 100 gallons of water and add to it twenty pounds of sugar or its equivalent from any of the saccharine matters aforesaid, to this I add a small portion of dissolved animal gelatin made say 10 days previous. The result is that lactic acid is formed which is the best known solvent of lime. The skins are soaked in the liquid for the space of from 10 to 15 hours, the whole of the lime is dissolved and swims in flakes on the surface of the liquid which is a saccharate of lime and is insoluble and easily removed. I only then require to add at intervals a small portion of sugar and the solution is constantly kept up in good condition for use, the animal gelatin being afterwards supplied by the dissolving of a small quantity from each skin while in the solution of this process the lime is effectually removed from the hides and skins without putrefaction or destruction in any way to the gelatinous tissues.

The hides and skins being prepared in the manner before described and being well washed and colored I propose to tan them by the application of a newly discovered physical force differing from ordinary capillary attraction or hydrostatic pressure viz., a law discovered by Monsr. Dutrochet, one of the members of the Institute of France, which law is fully described in the *Encyclopedia of Practical Medicine* and called by him the law of endosmosis and exosmosis. It may be necessary here to describe this new physical law above named before entering into any description of its applicability to the purposes of tanning which forms the principal part of my invention.

It is a well established fact that when two liquids of different densities are separated by a membrane or septum two opposite currents are established in contrary directions— the one outward and the other inward the greater current passes through the membrane and accumulates on the side where the liquid is of the greatest specific gravity on whichever side of the membrane it may be placed and the lesser current flows through the membrane to the opposite liquid and these interchanges continue acting until such time as the specific gravity of the fluids on each side of the membrane becomes alike unless a chemical change or obstruction takes place to prevent it. The current in one direction is called endosmosis and that in the opposite direction exosmosis. This law has been known and recognized for some time but it has never been applied for the purpose of tanning by bringing liquids containing tannic acid into contact with the gelatinous matter in the hides or skins so as to cause a thorough chemical union between them, my invention or discovery therefore consists in the application of this physical force in the tanning of hides or skins.

To secure the advantage of endosmosis and exosmosis in the tanning of hides and skins I take the hide or skin after it has been divested of lime as before described and color it in tanning liquor in the ordinary manner. I then form the hide or skin into a bag by sewing it together with strips of raw hide or tanned leather leaving only sufficient room at the neck of the skin to introduce ground oak bark or any other material containing tannin or tannic acid and to introduce the hose pipe after mentioned shown in the drawing the proportion of bark to the skin or hide to be tanned is about 2 pounds of bark to every pound weight of wet hide, the hide should then be attached to the hose pipe by means of a clamp or screw so as to exclude the atmospheric air and be immersed about one half of its depth in tanning liquor of a specific gravity equal to from two to eight degrees. The same liquor is then pumped up into the chute shown in the drawings by means of the pump and enters into the bags (A, A,) formed of the hide through the wooden spicket or cocks (C, C,) and the hose (D, D,) when the liquor comes in contact with the fresh ground bark previously put into the skin its specific gravity is increased to from 10 to 20, degrees in the course of a few hours. The before mentioned law termed endosmosis and exosmosis then begins to operate, there being two currents kept up as before described the lighter fluid passing to the heavy fluid, and the heavy to the lighter, thereby keeping up a double current through the hide or skin until there is a balance restored between the two liquids or in other words until the specific gravity of each becomes the same while this natural balance is sought for between the 2 liquids the gelatinous tissues or fibers take up the tannin or tannic acid and the hide or skin is thoroughly converted into leather. During this process the bags formed of the hide or skins become partially empty by exudation but are filled again by the pump (E, E,) the hides are also turned several times during the process of tanning so as to insure a uniform action of the currents throughout their whole substance. I may here remark that the liquor in the tanks is seldom changed, its strength being sufficiently kept up by the superfluous tanning matter that passes through the hides as soon as the hide is thoroughly tanned and the law of affinity being sufficiently satisfied the tanning matter from the strong liquor passes to the weaker liquor thereby keeping up a uniform strength of about 2 to 3 degrees of the hydrometer.

The advantages to be derived from the improvements in tanning leather are the saving of time and producing a much better article than can be possibly obtained by the old method.

I may here state that I am now at this present time effecting the tanning of calf skins in from 5 to 6 days, and ox hides in from 14 to 20 days and producing goods of a superior quality to any that are tanned by the old methods.

I think it necessary here to state that I do not claim the principle of tanning hides and skins by serving them into bags nor by simply filling them with liquor but What I do claim as of my invention and desire to secure by Letters Patent is—

1. The discovery of the means of extracting the lime with which the hides and skins are impregnated in removing the hair by the use of sugar or any other saccharine matter whether obtained from the sugar cane, honey, beet root turnips, potatoes, the maple tree, or other vegetable substances, all of which is fully set forth and described in the specification.

2. I claim the discovery of the application of the law of endosmosis and exosmosis to the purposes of tanning with the materials and in the manner before described in the specification, and shown in the drawing or in any way wherein the hide or skin can be placed between the fluids containing tannin or tannic acid of different specific gravity.

In witness whereof I the said Alexander Turnbull have hereunto set my hand and seal this nineteenth day of July 1847.

A. TURNBULL. [L. S.]

Witnesses:
 PAUL R. HODGE,
 JOHN R. RIGLEY.